June 15, 1926.
O. W. G. RABE
1,589,224
AUTOMATIC AIR CONTROLLING DEVICE
Filed April 27, 1925
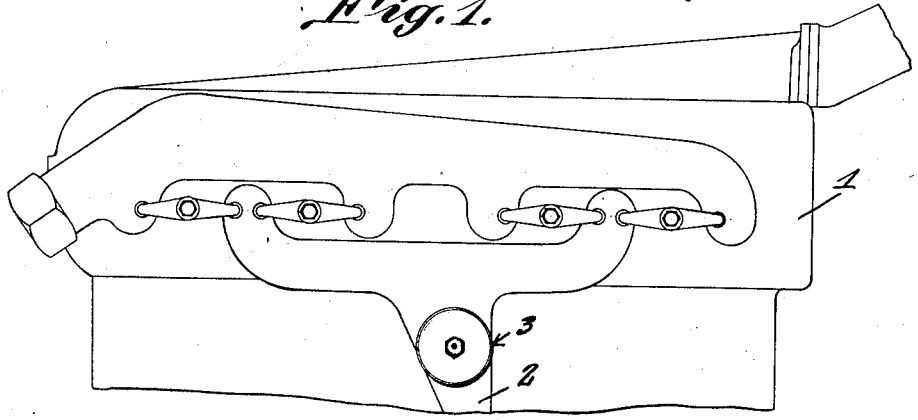
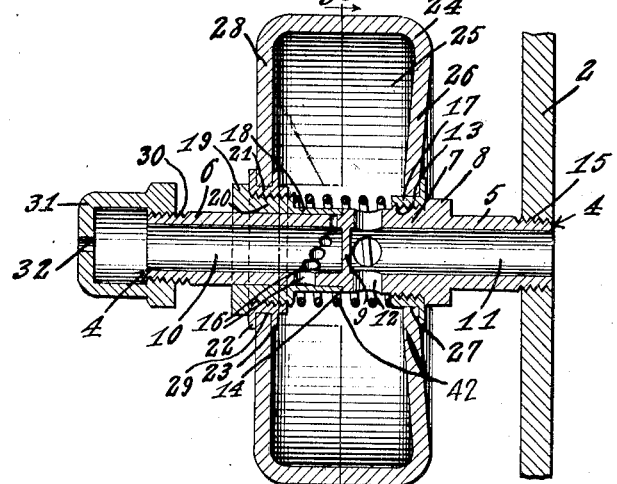
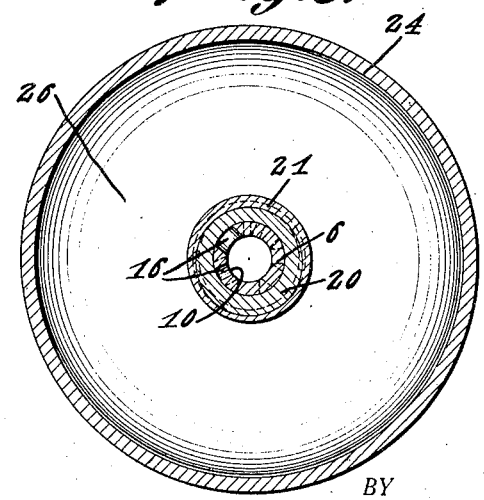
INVENTOR.
O.W.G. Rabe,
BY
Geo. F. Kimmel. ATTORNEY.

Patented June 15, 1926.

1,589,224

UNITED STATES PATENT OFFICE.

OTTO WILLIAM GUSTAVE RABE, OF LANCASTER, CALIFORNIA.

AUTOMATIC AIR-CONTROLLING DEVICE.

Application filed April 27, 1925. Serial No. 26,213.

This invention relates to an automatic air control, such as an automatically operable auxiliary air inlet device for internal combustion engines, and has for its object to provide, in a manner as hereinafter set forth, a device of such class having means controlled by varying speeds of the engine above a predetermined speed for automatically controlling the supply of secondary air to the intake manifold of the engine for admixing with the combustible charge to thereby thin the same to increase the efficiency of the engine, to obtain a greater mileage from the charge, to clean the carbon from the engine cylinder, to overcome carbon formation therein, and to prevent the fouling of the spark plugs.

Further objects of the invention are to provide, in a manner as hereinafter set forth, an auxiliary air inlet device controlled by the speed of the engine, and which is simple in its construction and arrangement, strong, durable, compact, thoroughly efficient in its use, readily connected to the intake manifold of the engine, and inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a side elevation of an internal combustion engine showing the adaptation with the intake manifold thereof of an auxiliary air inlet device, in accordance with this invention.

Figure 2 is a vertical sectional view of the device.

Fig. 3 is a section on line 3—3, Figure 2.

Referring to the drawings in detail, 1 denotes an internal combustion engine, 2 the intake manifold thereof, and 3 generally designates the auxiliary air inlet device, secured to and opening into the intake manifold 2 intermediate the ends thereof, preferably in proximity to the carbureter, not shown, of the engine.

The auxiliary air inlet device when in inactive position opens the supply of auxiliary air to the intake manifold of the engine and it includes an auxiliary air supply tube of substantial diameter referred to generally by the reference character 4. The tube 4 comprises an inner end portion 5, an outer end portion 6 and an intermediate portion 7, of greater outer diameter than either of the end portions. At the point of joinder of the portion 7 with the portion 5, the former is provided with a laterally extending annular flange 8. At the point of joinder of the portion 7 with the portion 6, the former is provided with an inwardly arranged integral disk 9, forming the tube 4 with what may be termed an air inlet passage 10 and an air outlet passage 11. The disk 9, which further constitutes a partition is disposed centrally of the tube 4. The portion 7 of the tube 4, in close proximity to the disk 9, is formed with a series of spaced intake openings 12, of substantial diameter, for the passage 11. The periphery of the portion 7, between the flange 8 and openings 12, is threaded, as at 13. The portion 7 projects laterally with respect to the portion 6, thereby providing a shoulder or stop 14.

The portion 5, at its inner end, is peripherally threaded for engagement with the threaded wall of an opening 15 formed in the intake manifold 2 for the purpose of detachably connecting the tube 4 to the manifold. The opening 15 is preferably arranged in proximity to the carbureter, not shown, of the engine.

The portion 6 is formed with a circumferentially extending row of spaced openings 16 which gradually increase in diameter relatively to each other throughout. The row of openings is spirally arranged with respect to the axis of the portion 6, and the smallest of said openings is positioned in proximity to the disk 9. The openings 16 provide progressively increasing outlets for the air inlet passage 10, and said row of openings is adapted to be closed in a manner to be presently referred to.

Threadedly engaging with the threads 13 of the portion 7, is a flanged collar 17, having the flange thereof abutting against the inner face of the flange 8 of the portion 7. Slidably mounted on the portion 6 and adapted to abut against the shoulder 14 when the device has been actuated to close the ports 16, is a shiftable sleeve 18 provided with a flange 19 at its outer end and further provided with a peripherally threaded thickened part 20, having engaging therewith an interiorly threaded collar 21, formed with an outer and an inner annular flange 22, 23, respectively. The flange 22 abuts against the flange 19.

The sleeve 18 is shiftable relatively to the portion 6 through the medium of the shiftable front wall 28 of a closed circular casing 24, preferably constructed of leather and providing an air chamber 25. The rear wall 26 of the casing 24 is provided with a centrally disposed opening 27, and through the latter extends the collar 17 and the flange of the latter abuts against the outer face of said wall 26. The wall of the opening 27 snugly engages the periphery of the collar 17 to provide a substantially air-tight joint. The front wall 28 of the casing 24 is provided with an opening 29, the wall of which snugly engages the periphery of the collar 21. The flange 22 of the collar 21 abuts against the outer face of the wall 28 and the flange 23 abuts against the inner face of said wall 28.

The portion 6, at its outer end, is peripherally threaded, as at 30, and adjustably engaging therewith is a cap 31 formed with an air intake 32. Surrounding the tube 4 and interposed between the collars 17 and 21 is a coiled controlling spring 42 normally acting to shift the wall 28 of the casing for the purpose of shifting the sleeve 18 relatively to the portion 6 to open the outlets formed by the openings 16.

The device acts to increase the supply of auxiliary air to the intake manifold when the engine operates at variable speeds above a predetermined speed, and the openings 12 provide for the passage of air from the chamber 25 to the intake manifold up to said predetermined speed, by way of example, said predetermined speed will be twelve miles an hour. When the engine operates at variable speeds above the speed of twelve miles an hour, the wall 28, due to the action of the spring 42, will be shifted outwardly and due to the suction action of the engine will be shifted inwardly and under such conditions will engage the sleeve 18 thereby causing the latter to slide in like directions on the portion 6 of the tube 4 to uncover one or more of the openings 16 to provide for an increased or decreased supply of auxiliary air to the intake manifold and owing to the manner of setting up the openings 16, that is progressively increasing in diameter, the supply of auxiliary air is controlled and such control is governed by the speed of the engine.

When the engine is not running the wall 28 and sleeve 18 will stand in their outermost positions, due to the expansive action of the spring 42. Initially any suitable means is employed to hold the sleeve in closed position when the engine is started, after which the sleeve is released. While the engine is idling, with throttle valve partially closed or operating up to a predetermined speed, by way of example twelve miles an hour, the suction in the manifold is sufficiently high to overcome the force of the spring 42 and the wall 28 and sleeve 18 will be held in the position shown in Figure 2. As the throttle of the engine is opened, however, the suction is reduced and the spring 42 gradually forces the wall 28 and sleeve outwardly to open one or more of the openings 16. The position of the sleeve 18 is dependent upon the degree of suction in the manifold, and, therefore, upon the setting of the throttle valve or in other words the position of the sleeve is controlled by the degree of suction.

It is thought that the many advantages of an automatic air control such as an auxiliary air inlet device, in accordance with this invention, for internal combustion engines, can be readily understood, particularly in view of the fact that the supply of auxiliary air is controlled by the speed of the engine when the latter is operating at variable speeds above a predetermined speed, as the device when active will not only provide for the thinning of a combustible charge to increase the efficiency of the engine to obtain a greater mileage from the charge, but also for the cleaning of carbon from the engine cylinder, to overcome carbon formation and further to prevent fouling of the spark plugs, and although the preferred embodiment of the invention is as illustrated and described, yet it is to be understood that changes in the details of construction can be had which will fall within the scope of the invention as claimed.

What I claim is:—

1. An auxiliary air inlet device for internal combustion engines comprising a tubular element provided with means to form a pair of separated air passages, one communicating with the atmosphere and the other adapted to open into the intake manifold of the engine, a casing surrounding said element, providing an air chamber and formed with a spring controlled shiftable wall, said element provided with means for establishing communication between said chamber and that passage opening into the intake manifold for controlling the shifting of said wall by the suction action of the engine above a predetermined speed and to provide for a supply of auxiliary air to the intake manifold, said element further provided with progressively increasing means to establish communication between said chamber and that passage communicating with the atmosphere to supply auxiliary air to said chamber, and slidable means mounted on said element and actuated on the shift of said wall for controlling the supply of air through said progressively increasing means to said chamber.

2. An auxiliary air inlet device for internal combustion engines comprising a tubular element provided with means to form a pair of separated air passages, one communicating with the atmosphere and the other adapted to open into the intake manifold of the engine, a casing surrounding said element, providing an air chamber and formed with a spring controlled shiftable wall, said element provided with means for establishing communication between said chamber and that passage opening into the intake manifold for controlling the shifting of said wall by the suction action of the engine above a predetermined speed and to provide for a supply of auxiliary air to the intake manifold, said element further provided with progressively increasing means to establish communication between said chamber and that passage communicating with the atmosphere to supply auxiliary air to said chamber, slidable means mounted on said element and actuated on the shift of said wall for controlling the supply of air through said progressively increasing means to said chamber, and said element provided with a stop for limiting the closing movement of said slidable means.

3. An auxiliary air inlet device for internal combustion engines comprising a tubular element provided with means to form a pair of separated air passages, one communicating with the atmosphere and the other adapted to open into the intake manifold of the engine, a casing surrounding said element, providing an air chamber and formed with a spring controlled shiftable wall, said element provided with means for establishing communication between said chamber and that passage opening into the intake manifold for controlling the shifting of said wall by the suction action of the engine above a predetermined speed and to provide for a supply of auxiliary air to the intake manifold, said element further provided with progressively increasing means to establish communication between said chamber and that passage communicating with the atmosphere to supply auxiliary air to said chamber, slidable means mounted on said element and actuated on the shift of said wall for controlling the supply of air through said progressively increasing means to said chamber, and a controlling spring for said wall, said spring mounted on said element and slidable means.

4. An auxiliary air inlet device for internal combustion engines comprising a tubular element provided with means to form a pair of separated air passages, one communicating with the atmosphere and the other adapted to open into the intake manifold of the engine, a circular casing surrounding said element, providing an air chamber and formed with a spring controlled shiftable wall, said element provided with means for establishing communication between said chamber and that passage opening into the intake manifold for controlling the shifting of said wall by the suction action of the engine above a predetermined speed and to provide for a supply of auxiliary air to the intake manifold, said element further provided with progressively increasing means to establish communication between said chamber and that passage communicating with the atmosphere to supply auxiliary air to said chamber, slidable means mounted on said element and actuated on the shift of said wall for controlling the supply of air through said progressively increasing means to said chamber, said element provided with a stop for limiting the closing movement of said slidable means, and a controlling spring for said wall, said spring mounted on said element and slidable means.

In testimony whereof, I affix my signature hereto.

OTTO WILLIAM GUSTAVE RABE.